Patented Dec. 2, 1947

2,431,977

UNITED STATES PATENT OFFICE 2,431,977

FABRIC AND METHOD OF MANUFACTURING ARTICLES THEREFROM

Sterling W. Alderfer, Akron, Ohio, assignor of one-half to Edward D. Andrews, Akron, Ohio No Drawing. Application November 5, 1943, Serial No. 509,151

12 Claims. (Cl. 28—74)

The present invention relates to the manufacture of rubber and fabric articles and while it may have many adaptations and uses it is primarily intended for use in the manufacture of automobile tires, it being the purpose of the invention to improve upon the methods now in common and accepted use so as to secure a better and more uniform structure.

Referring primarily to automobile tires, it has been common practice for a great many years to construct the carcass of a tire from rubber coated and impregnated fabrics of which the outstanding fabric and the one most commonly employed is known as the "weak-weft" fabric. This fabric is formed of comparatively large warp threads or cords which are held together in the semblance of a fabric by fine weft or pick threads woven at intervals through the warp threads so as to hold them together until the rubber coating is applied, usually by the familiar calendering operation which may be preceded by dipping the uncoated fabric in a rubber cement or in a bath of latex or artificial dispersion of rubber in water.

The weak-weft fabric has a certain disadvantage in that the heavy warp threads or cords are necessarily displaced to a certain extent by the weft or pick threads so that noticeable undulations are imparted to those threads, which undulations are not entirely removed during the building of the tire or during the stretching and shaping operations which are used to bring the uncured carcass from the flat or band form in which it is built to its arched or tire shape in which it is vulcanized. Nor can the expansion to which the tire is subjected in the vulcanizing operation completely remove this waviness in the cords. As a result, the strength of the tire is impaired by the fact that undulations in the cords are not completely removed. Also its "growth," i. e., its gradual enlargement during use, is promoted by the fact that the cords have a definite over-all elongation before any actual stretch is exerted upon them.

It has also been held by some that these weft threads which in no way contribute to the strength of the tire actually impair its lasting qualities because the weft threads tend to cut or saw through the heavy warp threads at their intersections during the flexing of the tire in use.

A number of remedies have been proposed to meet these various objections to the standard weak-weft fabric. The pick has been reduced in size and strength so that in some cases only a very filamentary strand has been employed with just sufficient strength to hold the warp threads together in a flimsy fabric form until the application of the rubber by the first calender, or until a pre-calender coat is applied. It has also been the practice to reduce the number of pick threads until even 1½ pick threads to the inch have been used. Many concerns have also employed what are known as "pick-breakers" during the calendering operations to break the pick threads. It has also been a common practice to employ a very loose pick laid into the fabric without tension so that the undulations will be greater in the weft threads. These expedients have to some extent reduced the waviness in the cords of the completed tire but the waviness or undulations in the cords are not entirely eliminated and the residual weft threads remain in the completed tire so that any of their objectionable features are still retained.

It has also been a practice employed by a few concerns to make a so-called "weftless fabric" by conducting unconnected warp threads directly from extensive creels to latex baths or directly to the calender but these processes have many objections due, among other things, to the fact that the operation and maintenance of the vast creels and cord guiding and heating means are very expensive and constant attention is required to assure that the warp threads do not become misplaced during the preparation and rubberizing of the weftless fabric.

In some of the prior patents it has been proposed that for the weft threads there be employed threads or filaments made of various synthetic resins which will melt or disintegrate from the heat employed in the vulcanizing process. The objection to this so-called remedy for the problem is that it does not remove the undulations in the cords for the weft threads will remain in the fabric during the whole tire building and shaping operation and up to the moment when the rubber components of the tire are being vulcanized. As the actual movement possible in the cords during vulcanization of the tire is almost negligible, the waviness which has been imparted to the warp threads will remain and be fixed in the completely vulcanized tire. While these proposed processes are claimed to eliminate the weft threads in the completed tire, the waviness or undulations in the cords or warp threads are still preserved in the completed tire.

By the process disclosed herein, however, the weft threads are eliminated or rendered absolutely ineffective upon the very first application of rubber so that during the preliminary treatment and during calendering and the subsequent building and shaping operations they are incapable of offering any resistance to the longitudinal stresses exerted in the direction of the cords and the cords will be straightened out.

These wholly new and beneficial results are accomplished by the procedure now to be described.

The cord-tire fabric which constitutes the carcass of the tire is made as any of the standard weak-weft fabrics is made, that is, the warp threads are the usual cords of cotton, rayon, nylon, or any other materials. The weft threads, however, are made of any one of the recently developed but now well known artificial or synthetic resins which is preferably soluble in water. Excellent results may also be secured by resins which soften sufficiently so that they become more or less jelly-like and offer no resistance whatever to the straightening out of the cords in the fabric preparation or tire building and making operations. While there may be numerous artificial or synthetic resins or plastics which are capable of use in the manufacture of filaments or threads, polyvinyl alcohol responds to these requirements and may be employed for the purpose.

Fabric constructed in the manner set forth is first passed through a bath of natural or artificial latex or is saturated with either of these preliminary coating solutions. As natural latex even in its concentrated condition such as usually employed in this country has a large content of water, this water will either wholly dissolve or so soften the material from which the weft threads are made as to render them wholly incapable of offering any resistance to the straightening out of the cords when the tension is applied. Artificial latices are universally water-dispersions of rubber and the water contained therein will react in similar fashion. In either case the rubber deposited on the fabric will hold the cords together in a sheet until the fabric reaches the calender which applies the first coat of rubber. In the coating or impregnating operation, a very considerable pulling force is exerted on the fabric which will straighten the cords out because the weft threads have been destroyed or weakened by the water to such an extent that there is nothing to prevent this action. If the undulation or waviness in the cords is not wholly removed during the preliminary treatment, it will be completely removed during the calendering and building and shaping operations.

There are many other advantages to the present invention, one of which is that as the weft threads are eliminated or rendered ineffective at the very start of the rubberizing operation, the weft threads may be increased in cross-section and number so that the warp or main cords are held in more firm and substantial fabric form which facilitates the handling and manipulation of the uncoated fabric.

As noted above, complete solubility of the substances from which the weft threads are formed is not required. As softening under the action of the water contained in the preliminary coating is all that may be required and, therefore, when the term "soluble" is employed in the claims, it is to be considered of sufficiently broad scope to cover only a weakening of the weft threads to an extent sufficient to insure that they will offer no resistance to the straightening out of the cords on the application of tension exerted in the direction of the cords.

It will be also understood that while the utility of the process and the new fabric is primarily in the manufacture of automobile cord tires, it is by no means limited to this field but may be employed wherever fabrics are used in which parallel, unconnected cords form the body of the completed article. Nor is the invention necessarily limited to the employment of water soluble synthetic resins such as indicated above as other materials may be found adaptable for the weft threads provided they are so weakened or disintegrated by the pre-calender treatment that they offer no resistance to the straightening out of the warp threads during the subsequent operations which exert longitudinal tension on the fabric.

It will also be understood that where the term "latex" is employed, it is intended to apply to natural latex or any concentration or modification thereof and to any of the many artificial dispersions of rubber in water which are used as substitutes therefor.

What is claimed is:

1. In the process of manufacturing a rubberized cord fabric for automobile tires or other rubber articles, the steps of making a fabric with parallel warp cords and interwoven weft threads, the weft threads being composed of a material which is soluble in water, dipping said fabric in a bath of latex prior to calendering, the said bath disintegrating the weft threads and depositing rubber upon the warp cords, subjecting the article to a stretching operation which will remove the undulations in the warp cords, and applying a coat of rubber to the surface of the fabric.

2. In the process of making automobile tires or other rubber articles, the steps of forming a fabric with parallel warp cords and interwoven weft threads, the weft threads being composed of a material which is so affected by water that the weft threads will offer no resistance to the removal of the undulations from the warp cords, applying water-containing latex to the fabric, and exerting sufficient longitudinal tension to the fabric to cause straightening of the warp cords.

3. In the process of making automobile tires or other rubber articles, the steps of forming a fabric with parallel warp cords and interwoven weft threads, the weft threads being composed of a resinous material which is so affected by water that the weft threads will offer no resistance to the removal of the undulations from the warp cords, applying water-containing latex to the fabric, and exerting sufficient longitudinal tension to the fabric to cause straightening of the warp cords.

4. In the process of making automobile tires or other rubber articles, the steps of forming a fabric with parallel warp cords and interwoven weft threads, the weft threads being composed of polyvinyl alcohol which is so affected by water that the weft threads will offer no resistance to the removal of the undulations from the warp cords, applying water-containing latex to the fabric, and exerting sufficient longitudinal tension to the fabric to cause straightening of the warp cords.

5. In the process of manufacturing articles containing a fabric having a coating of rubber thereon, the steps of forming the fabric from parallel warp cords and interwoven weft threads, the latter being formed of a material which will disintegrate sufficiently in the presence of water so that the weft threads offer no resistance to the removal of any waviness in the warp cords, and wetting the fabric with water and stretching it longitudinally.

6. In the process of manufacturing articles containing a fabric having a coating of rubber calendered thereon, the steps of forming the fabric from parallel warp cords and interwoven weft threads, the latter being formed of a material which will disintegrate sufficiently in the presence of water so that the weft threads offer no resistance to the removal of any waviness in the warp cords, and passing the fabric through a water-containing bath prior to calendering.

7. In the process of manufacturing articles containing a fabric having a coating of rubber calendered thereon, the steps of forming the fabric from parallel warp cords and interwoven weft threads, the latter being formed of a material which will disintegrate sufficiently in the presence of water so that the weft threads offer no resistance to the removal of any waviness in the warp cords, and passing the fabric through a bath of water having rubber dispersed therein prior to calendering.

8. In the process of manufacturing a fabric having a coating of rubber calendered thereon, the steps of forming a fabric from parallel warp cords and interwoven weft threads, the latter being composed of a material which will disintegrate sufficiently under the pre-calendering treatment to permit the removal of undulations in the warp cords, treating the fabric so as to disintegrate the weft threads, and then applying a calender coat of rubber to the fabric.

9. In the process of manufacturing a fabric having a coating of rubber calendered thereon, the steps of forming a fabric from parallel warp cords and interwoven weft threads, the latter being composed of a material which will disintegrate sufficiently under the pre-calendering treatment to permit the removal of undulations in the warp cords, passing the fabric through a bath which will disintegrate the weft threads, and then applying a calender coat of rubber to the fabric.

10. In the process of manufacturing a fabric having a coating of rubber calendered thereon, the steps of forming a fabric from parallel warp cords and interwoven weft threads, the latter being composed of a material which will disintegrate sufficiently under the pre-calendering treatment to permit the removal of undulations in the warp cords, passing the fabric through a bath which will deposit rubber thereon and disintegrate the weft threads, and then applying a calender coat of rubber to the fabric.

11. In the process of manufacturing articles containing a fabric having a coating of rubber thereon, the steps of forming a fabric from parallel warp cords and interwoven weft threads, the latter being composed of a water soluble material, and treating the fabric with a water dispersion of rubber.

12. In the process of manufacturing articles containing a fabric having a coating of rubber calendered thereon, the steps of forming a fabric from parallel warp cords and interwoven weft threads, the latter being composed of polyvinyl alcohol, and treating the fabric with a water dispersion of rubber prior to calendering.

STERLING W. ALDERFER.

REFERENCES CITED

The following references are of record in the file of this patent:

UNITED STATES PATENTS

| Number | Name | Date |
|---|---|---|
| 1,605,453 | Midgley | Nov. 12, 1926 |
| 1,955,582 | Golding | Apr. 17, 1934 |
| 2,173,997 | Burgeni | Sept. 26, 1939 |
| 2,314,996 | Lessig et al. | Mar. 30, 1943 |
| 2,287,139 | Schneider | June 23, 1942 |
| 2,331,955 | Beebe | Oct. 19, 1943 |

FOREIGN PATENTS

| Number | Country | Date |
|---|---|---|
| 509,563 | Great Britain | July 18, 1939 |
| 525,038 | Great Britain | Aug. 20, 1940 |
| 550,525 | Great Britain | Jan. 13, 1943 |